United States Patent [19]

Meyers

[11] Patent Number: 5,066,338
[45] Date of Patent: Nov. 19, 1991

[54] SOLAR POWERED NAVIGATION BUOY GENERATOR

[76] Inventor: Roy D. Meyers, 15 Cooper St., Lake George, N.Y. 12845

[21] Appl. No.: 512,130

[22] Filed: Apr. 13, 1990

[51] Int. Cl.$^5$ .................... H01L 31/042; B63B 22/00
[52] U.S. Cl. ................................. 136/244; 136/291; 441/16; 362/183
[58] Field of Search ................ 136/291, 244; 441/16; 362/183

[56] References Cited

U.S. PATENT DOCUMENTS

| 3,603,952 | 9/1971 | Smith | 340/539 |
| 4,481,562 | 11/1984 | Hickson | 362/183 |
| 4,841,416 | 6/1983 | Doss | 362/183 |

FOREIGN PATENT DOCUMENTS 2115915 9/1983 United Kingdom ............. 136/291

OTHER PUBLICATIONS

Ampenex, Division of North American Philips, product literature, approximate printing date-1980.

Primary Examiner—Aaron Weisstuch

[57] ABSTRACT

A solar electric generating system is provided which directly generates D.C. current from ambient light to charge a rechargeable battery through a blocking diode, and a wiring harness adaptable to connect to the existing internal circuitry of conventional existing navigation bouys. This invention is designed to be used as an add on to convert existing navigation bouys that now use throw-away batteries to more economical rechargeable batteries at a very low cost.

1 Claim, 2 Drawing Sheets

SOLAR POWERED NAVIGATION BUOY GENERATOR

BACKGROUND OF THE INVENTION

1. Field of the Invention

This invention is to be used as an add on to small existing navigation buoys.

This invention relates in general to the use of mini solar panels which in turn convert sunlight into usable electricity to charge a rechargeable gelled electrolyte battery located inside of an existing navigation buoy caisson. The battery in turn operates the existing buoy electronics system.

2. Prior Art

In the past, lighted navigation buoys have been powered with disposable batteries that had to be replaced several times in a boating season and then disposed of into the environment, very costly in dollars, and more importantly costly to the environment.

Solar generators using solar panels to convert sunlight into electricity are already known to power larger navigation beacons. See, e.g. U.S. Pat. No. 4,759,735, issued July 26, 1988. They are complicated and expensive to build.

No device is known, however, to charge small navigation buoys at an economical cost, and to eliminate the enormous quantity of disposable batteries being disposed of into the environment.

SUMMARY OF THE INVENTION

The principal object of the present invention is to provide a device that is practical, dependable, and inexpensive to build and easy to adapt to existing lighted navigation buoys.

Another object is to provide such a device in lightweight rugged form that can be stored easily withought being disconnected from the buoy when not in use. When not in use and stored in a lighted environment the gelled electrolyte battery will remain charged and will have a life expectancy of several years.

The foregoing objects can be accomplished by providing a flat, light weight platform with solar panels mounted on it. In the preferred embodiment of the invention the platform is formed from a flat piece of stainless steel that is formed and fitted to a caisson of an existing buoy.

The flat and formed stainless steel platform with solar panels mounted on it has a round hole of sufficent size punched in the center of it to allow the unit to fit down over the existing buoy. A wiring harness is routed from each solar panel mounted on the flat stainless steel platform through a hole in the side of the buoy caisson and internally connected to the battery that in turn is connected to the existing electronics of the buoy.

DETAILED DESCRIPTION

Figure 1:
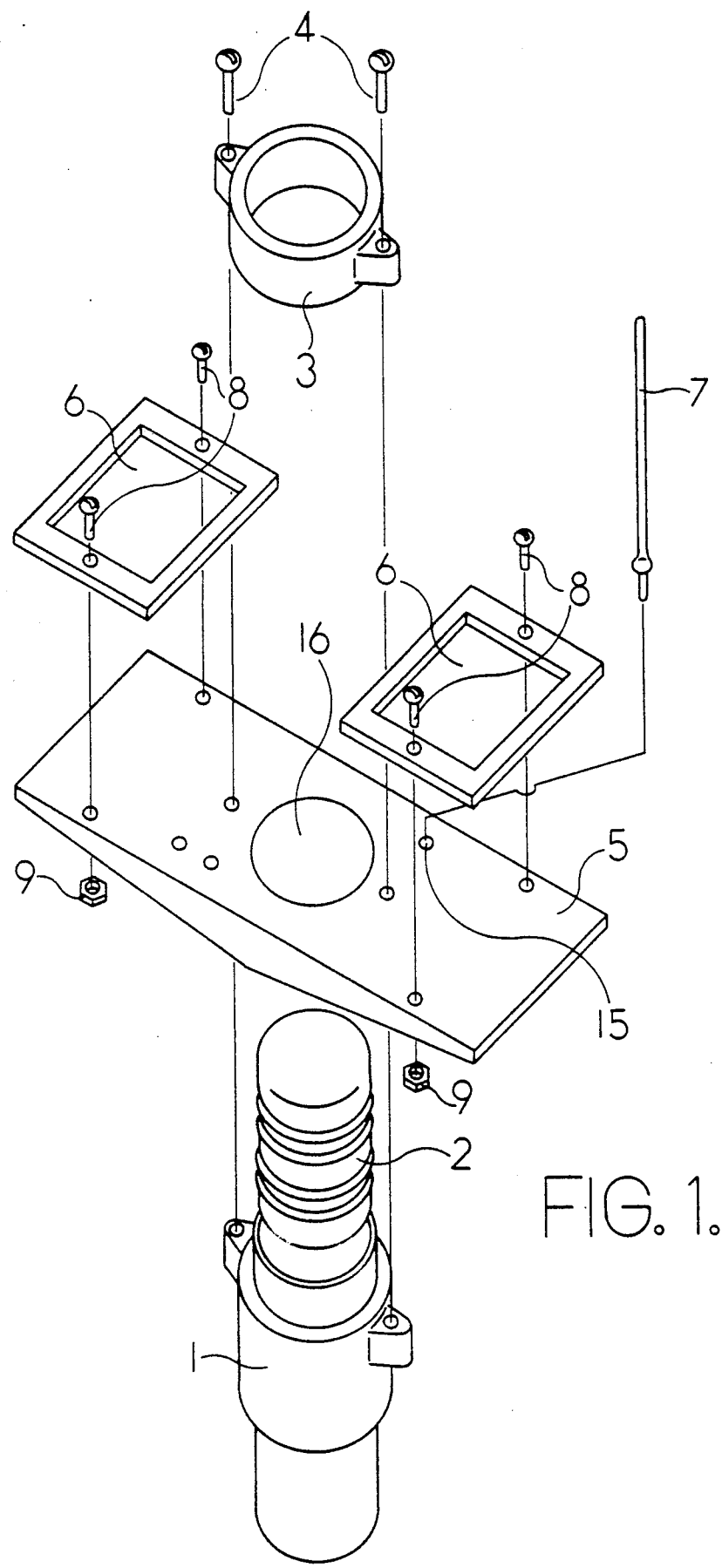
FIG. 1. Is an overall schamatic of the device as it adapts to an existing navigation buoy.
Figure 2:
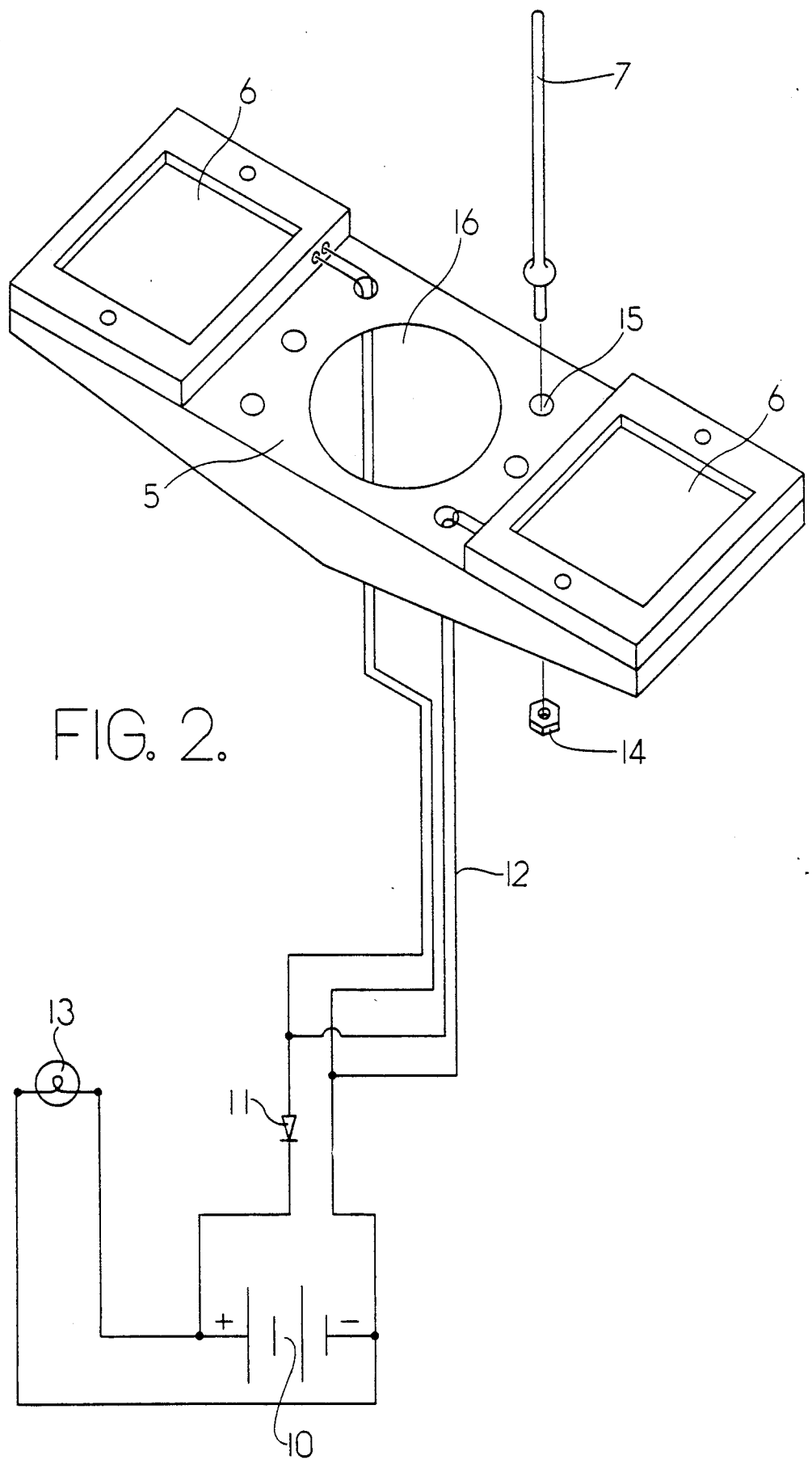
FIG. 2, is an overall view of the device including the wiring harness and battery.

As shown in the drawing figs., the preferred solar powered navigation buoy generator in accordance with the present invention includes a formed platform 5 of rectangular shape which preferably is stainless steel. The platform 5 is punched with a round hole 16 in the center corresponding to the size of the existing buoy caisson.

Two mini solar panels 6 are connected onto the top on each end of the platform 5 by means of four mounting bolts 8 and secured by four locking nuts 9. A whip antenna 7 is fastened to the platform 5 through a predrilled hole 15 and secured by a locking nut 14. The wiring harness 12 is then connected to the solar panels 6 and then routed through a small hole in the wall of the existing buoy caisson 1. The wiring harness 12 with a blocking diode 11 series connected to the positive side of the wiring harness 12 is then connected to the gelled electrolyte battery 10 which in turn is connected to the existing internal electronics 13 of the existing buoy. The unit is then fitted down over the existing buoy light lens 2 and on to the collar of the existing buoy caisson 1. Then the existing buoy light lens locking nut 3 is placed down over the platform 5 and locked onto the existing buoy caisson 1 by means of two existing buoy lens locking security bolts 4.

What is claimed is:

1. A solar generating system designed to convert existing navigation buoys using conventional throwaway batteries to more economical rechargeable batteries lasting several years, said invention comprising a flat rectangular stainless steel mounting platform with two solar panels and two flexible antennas mounted on said platform and a hole punched in the center of said platform in the space between said two solar panels and sized to fit over the existing caisson of said buoy and adapted to be secured in place on said existing buoy caisson by means of the existing lens locking nut and security bolt of said caisson, a wiring harness connected to said solar panels mounted on said flat rectangular stainless steel platform adapted to extend through the wall of said buoy caisson and to connect with said rechargeable battery, further including a series connected blocking diode to prevent the battery from discharging during dark periods.

* * * * *